United States Patent [19]

Barnes

[11] Patent Number: 5,315,901
[45] Date of Patent: May 31, 1994

[54] AUTOMATIC TRANSMISSION WITH A MODULATED PRESSURE CONVERTER BYPASS CLUTCH PRIORITY VALVE CIRCUIT

[75] Inventor: Charles W. Barnes, Plymouth, Mich.

[73] Assignee: Ford Motor Company, Dearborn, Mich.

[21] Appl. No.: 992,226

[22] Filed: Dec. 17, 1992

[51] Int. Cl.⁵ .................................................. F16H 61/14
[52] U.S. Cl. ......................................... 192/3.3; 477/62
[58] Field of Search ............................................. 74/890

[56] References Cited

U.S. PATENT DOCUMENTS

| | | | |
|---|---|---|---|
| 3,805,640 | 4/1974 | Schneider et al. | 74/645 |
| 4,437,358 | 3/1984 | Kubo et al. | 74/867 |
| 4,468,988 | 9/1984 | Hiramatsu | 74/868 |
| 4,510,747 | 4/1985 | Koshida | 60/343 |
| 4,618,041 | 10/1986 | Sotoyama et al. | 192/44 |
| 4,651,593 | 3/1987 | Aoki et al. | 74/731 |
| 4,665,770 | 5/1987 | Van Selons | 74/733 |
| 4,781,279 | 11/1988 | Georg | 192/3.3 |
| 4,784,019 | 11/1988 | Morscheck | 74/720 |
| 4,843,920 | 7/1989 | Hayasaki et al. | 74/869 |
| 4,880,091 | 11/1989 | Hasegawa et al. | 192/3.3 |
| 4,889,012 | 12/1989 | Dull | 74/730 |
| 4,978,328 | 12/1990 | Pierce | 475/66 |
| 5,007,309 | 4/1991 | Lemon et al. | 74/869 |
| 5,010,991 | 4/1991 | Tsukamoto et al. | 192/3.3 |
| 5,029,087 | 7/1991 | Cowan et al. | 364/424.1 |
| 5,081,886 | 1/1992 | Person et al. | 74/866 |
| 5,090,527 | 2/1992 | Imamura et al. | 192/3.29 |
| 5,121,820 | 6/1992 | Brown et al. | 192/3.3 |
| 5,129,870 | 7/1992 | Pierce | 475/285 |
| 5,133,232 | 7/1992 | Kikuchi et al. | 74/870 |
| 5,150,297 | 9/1992 | Daubenmier et al. | 364/424.1 |

*Primary Examiner*—Dirk Wright
*Attorney, Agent, or Firm*—Roger L. May; Frank G. McKenzie

[57] ABSTRACT

An automatic transmission having a hydraulic torque converter and a multiple-ratio gear system in an automotive vehicle driveline wherein the converter includes a pressure-actuated bypass clutch and a control valve system for maintaining a regulated charge pressure in the torque converter and for controlling the actuation and release of the bypass clutch, the valve system including a main regulator that establishes a circuit pressure and that establishes priority distribution of pressurized fluid to the torque converter while temporarily interrupting distribution of pressurized fluid to the transmission lubrication circuit.

7 Claims, 4 Drawing Sheets

|     | CL1 | CL2 | CL3 | CL4 | CL5 | B1 | B2 | OWC1 | OWC2 | OWC3 | OWC1 | OWC2 | OWC3 | OWC4 |
|-----|-----|-----|-----|-----|-----|----|----|------|------|------|------|------|------|------|
| 1M  | X   |     | X   |     | X   |    | X  | N/A  | X    | N/A  | N/A  | X    | N/A  | N/A  |
| 2M  | X   | X   |     |     | X   |    | X  | O/R  |      | X    | O/R  |      | N/A  | N/A  |
| 1   | X   |     |     |     | X   |    |    |      | X    | X    | O/R  |      | O/R  | N/A  |
| 2   | X   | X   |     |     | X   |    |    | O/R  |      | X    | O/R  |      | O/R  | N/A  |
| 3   |     | X   | X   |     | X   |    |    |      | X    | O/R  |      | O/R  | O/R  | O/R  |
| 4   |     | X   | X   |     |     | X  |    | O/R  | O/R  |      |      | O/R  | O/R  | O/R  |
| R   | X   |     |     | X   | X   |    |    |      | X    | N/A  | N/A  |      | X    |      |

AUTOMATIC TRANSMISSION WITH A MODULATED PRESSURE CONVERTER BYPASS CLUTCH PRIORITY VALVE CIRCUIT

TECHNICAL FIELD

This invention relates to automatic power transmission mechanisms having a torque converter, a bypass clutch and a transmission control valve system for maintaining pressure distribution to the converter.

BACKGROUND OF THE INVENTION

My invention comprises improvements in an electronic control system of the kind described in U.S. Pat. Nos. 5,157,608, 5,081,886 and 5,029,087. It is an improvement also in a hydraulic control system of the kind shown in U.S. Pat. No. 4,665,770. Each of these patents is assigned to the assignee of my present invention.

Transmissions of the kind described in these prior art patents include multiple-ratio planetary gearing having clutch and brake structure for establishing multiple torque flow paths from an internal combustion engine to the traction wheels of an automotive vehicle. The multiple-ratio gearing defines a range of torque ratios for the torque flow paths. A hydrokinetic torque converter situated between the engine and the torque input element of the gearing comprises an impeller connected to the engine and a turbine adapted to be drivably connected to torque input elements of the gearing. A friction bypass clutch that forms a part of the torque converter is adapted to establish a positive driving connection between the impeller and the turbine when the torque converter achieves a hydrokinetic coupling condition. The bypass clutch unlocks to permit normal open converter operation when the vehicle driving conditions demand hydrokinetic torque multiplication.

The transmission includes a positive displacement pump that forms a part of a control valve system. Friction clutches and brakes control relative motion of the elements of the gearing and establish and disestablish torque reaction points in the gearing as the multiple ratios are effected. Fluid pressure-operated servos actuate the clutches and brakes.

A main regulator valve in the valve system maintains a circuit pressure as the valve system establishes controlled distribution of pressurized fluid to a transmission lubrication fluid circuit as well as to the hydraulic torque converter.

An electronically controlled throttle pressure solenoid establishes a solenoid feed pressure for various shift solenoids that are under the control of a microprocessor. The shift solenoids, in turn, are in communication with shift valves that form a part of the valve system. The shift valves selectively control distribution of actuating pressure to the clutch and brake servos. The solenoid feed pressure is distributed to the main regulator valve which effects the distribution of a control pressure to a bypass clutch control valve and to the lubrication fluid circuit. The bypass clutch control valve responds to operating variables either to engage or to disengage the bypass clutch.

If the operating conditions are such that a high pump output is required to accommodate a transient operating condition (e.g., a rapid change in ratio), the main regulator valve will respond by interrupting distribution of pressure to the torque converter and to the lubrication circuit until the valve system stabilizes and the demand for pressurized fluid by the valve system subsides.

It has been observed that there is a tendency for the bypass clutch and the torque converter to lose pressure during such transient condition when the supply of fluid to the converter is interrupted. This is due to the tendency of the fluid passages communicating with the converter to bleed down. When the transient condition subsides and pressurized fluid is reintroduced to the converter circuit, an uncontrolled harsh engagement of the bypass clutch may occur if the bypass clutch control valve is positioned to cause the bypass clutch to engage. Engagement timing of the bypass clutch, furthermore, may vary from its calibrated value due to a temporary reduction in converter pressure that results from such a transient condition.

BRIEF DESCRIPTION OF THE INVENTION

The improved valve system of my invention overcomes the harsh engagement problem and the timing problem associated with a valve system of the kind described in the references discussed above. It makes provision for establishing priority fluid distribution to the converter in those transient conditions that require increased pump delivery of pressurized fluid to the valve system and the clutch and brake servos. This is accomplished by interrupting distribution of pressure to the lubrication circuit while maintaining distribution of pressure to the converter and the bypass clutch throughout the duration of the transient event during which increased pressurized fluid distribution is required.

Provision is made for continuously supplying the converter and the bypass clutch with solenoid feed pressure and for continuously connecting the discharge fluid flow path for the converter and the bypass clutch to the inlet side of the main pressure regulator, which in turn controls distribution of pressure to the lubrication circuit. Thus, the pressure distribution to the lubrication circuit can be interrupted to accommodate the transient event that requires increased pressurized fluid distribution without interfering with the normal pressure supply to the converter and the bypass clutch. This establishes priority for the converter and the bypass clutch at the expense of the lubrication circuit. The interruption of flow to the lubrication circuit terminates after the transient event no longer exists. Normal lubrication of the transmission will resume before any adverse effects due to loss of lubrication pressure are encountered.

PARTICULAR DESCRIPTION OF THE INVENTION

Figures 1, 1A:
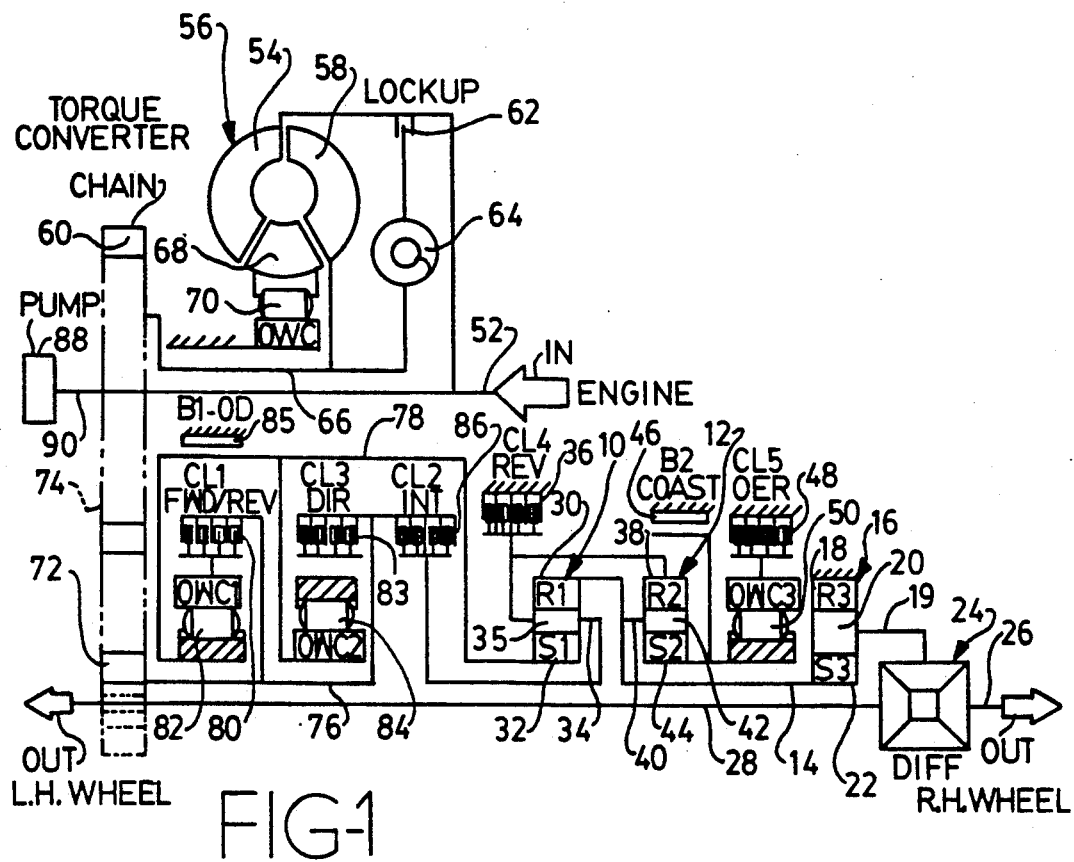
FIG. 1 shows a converter and gear system for an automotive vehicle transmission adapted to embody the improved valve circuit of my invention.
FIG. 1A is a chart showing the engagement pattern for the clutches and brakes that are activated and deactivated to establish multiple ratios of the gear system in FIG. 1.

For the purpose of describing a transmission gearing arrangement that might be used with a torque converter and bypass clutch control embodying my invention, I will describe here with reference to the schematic diagram of FIG. 1 a transaxle having four forward-driving ratios and a single reverse ratio for use in an automotive vehicle driveline.

In FIG. 1, the transmission gearing comprises two simple planetary gear units 10 and 12. A torque output shaft of the gearing shown in 14 acts as a torque input element for final drive simple planetary gear unit 16. Ring gear 18 of the gear unit 16 is anchored to the transmission housing. The carrier 19 of the gear unit 16 carries pinions 20 that mesh with ring gear 18 and torque input sun gear 22. Carrier 19 is connected to the carrier of a differential unit having side gears that are connected respectively to torque output shafts 26 and 28. These shafts are connected to the vehicle traction wheels (left-hand and right-hand wheels) through constant velocity universal joints and axle half shafts in known fashion.

Gear unit 10 comprises ring gear 30, sun gear 32 and carrier 34, the latter rotatably supporting pinions 35 which mesh with the ring gear 30 and the sun gear 32. Carrier 34 is adapted to be braked selectively by reverse friction disc brake 36.

Carrier 34 is connected directly to ring gear 38 of planetary gear unit 12. Ring gear 30 is connected directly to carrier 40 of gear unit 12. Planet pinions 42 journalled on the carrier 40 mesh with ring gear 38 and sun gear 44, the latter being adapted to be braked by a coast friction brake band 46.

Carrier 40 is connected to sun gear 22 of the final drive gear unit 16.

Sun gear 44 is adapted to be braked by friction brake 48 which is arranged in series with respect to overrunning coupling 50 having an inner race connected to the sun gear 44.

An internal combustion engine having a crankshaft axis 52 is connected to bladed impeller 54 of a hydrokinetic torque converter 56. A bladed turbine 58 is arranged in toroidal fluid flow relationship with respect to the impeller 54 and is connected to a drive sprocket schematically shown at 60. The axis of the crankshaft is parallel to the axis of driven shaft 28.

Lockup clutch 62, which has a spring damper 64, is adapted when applied to establish a direct mechanical connection between impeller 54 and turbine 58. Turbine 58 is connected to turbine shaft 66 which is connected drivably to the sprocket 60.

A bladed stator 68 mounted on an overrunning brake 70 makes it possible for hydrokinetic torque multiplication to occur in the converter 56.

Sprocket 60 is connected drivably to driven sprocket 72 by drive chain 74.

A gearing torque input shaft 76 is connected to the driven sprocket 72. Shaft 76 is connected to torque transfer drive drum 78 by forward and reverse friction clutch 80 and an overrunning coupling 82, the latter being arranged in series with clutch 80. Drum 78 also is connected to the shaft 76 by direct drive friction clutch 83 and by overrunning coupling 84, the latter being arranged in series with respect to the coupling 84. Coupling 82 is adapted for torque delivery in one direction, and coupling 84 is adapted for torque delivery in the opposite direction. Overdrive brake band 85 anchors drum 78 and sun gear 32 during overdrive operation.

Shaft 76 is adapted to be connected to carrier 34 through intermediate friction clutch 86. The gearing of the transaxle of FIG. 1 establishes four forward driving ratios and a single reverse ratio. Ratio selection is achieved by engaging and disengaging the clutches and brakes which will be described with reference to FIG. 1A.

In FIG. 1, the clutches and brakes have been identified by the symbols CL1, CL2, CL3, CL4, CL5, B1 and B2. These symbols correspond to forward and reverse clutch 80, intermediate clutch 86, direct clutch 83, reverse brake 36, brake 48, overdrive brake band 85 and coast brake band 46, respectively.

The clutches and brakes that are applied and released to establish each of the forward driving ratios and the reverse ratio are indicated in the chart of FIG. 1A. The overrunning clutches 82, 84 and 50 are designated by the symbols OWC1, OWC2, and OWC3, respectively. The symbol X in FIG. 1A designates a clutch or a brake that is applied. The symbol O/R indicates an overrunning condition for an overrunning coupling, and the symbol N/A for an overrunning coupling indicates that the coupling has no relative motion and that it does not carry torque.

Clutch CL1 is applied during operation in the first and second ratios. Thus, torque from the driven sprocket 72 is distributed through the clutch CL1 and through engaged overrunning coupling OWC1 to the sun gear 32. Ring gear torque on the ring gear 30 is distributed to the torque output shaft 14. Gear unit 10 establishes a dual torque flow path. The balance of the torque passing through gear unit 10 is received by carrier 34 drives ring gear 38 which provides feedback torque for carrier 34 of gear unit 10. With the sun gear 44 acting as a reaction member, carrier 40 then is driven in the direction of motion of the output shaft 14 so that the driving torque for both gear units 10 and 12 are additive. The reaction torque on the sun gear 44 is distributed through the engaged overrunning coupling OWC3. Brake CL5 is applied so that reaction torque on the sun gear 44 is distributed to the transmission housing.

To effect an upshift to the second ratio, clutch CL2 is applied while brake CL5 remains applied. Thus, the sun gear 44 continues to act as a reaction member. Torque is distributed from the driven sprocket 72 through the shaft 76 and through the engaged clutch CL2. Overrunning coupling OWC1 freewheels as clutch CL1 remains applied. Torque is delivered directly to the carrier 34 through the engaged clutch 86.

To achieve direct drive ratio, clutch CL2 is maintained applied, CL3 is applied, and clutch CL1 is released. Brake CL5 can remain applied, but since the overrunning coupling 50 permits freewheeling of sun gear 44, all of the gear elements of the gear units 10 and 12 are clutched together and rotate in unison. The non-synchronous "pickup" 2-3 shift from coupling OWC3 while brake CL5 remains applied simplifies the upshift and provides good shift quality.

Overdrive ratio is obtained by maintaining clutches CL2 and CL3 applied and by engaging brake band 85. Sun gear 32 thus is anchored, and torque is delivered to the carrier 34 through the engaged clutch CL2. Overrunning coupling OWC2 will overrun, so clutch 83 may remain applied. Coupling OWC3 continues to overrun as brake CL5 remains applied.

Reverse drive is obtained by engaging clutch CL1 and brake CL4. Clutch CL3 may remain applied since coupling OWC2 does not deliver torque. If the vehicle is coasting in the reverse direction, however, overrunning coupling OWC2 will transmit torque.

The clutches and brakes of the transaxle of FIG. 1 can be applied and released by a valve circuit that corresponds to the valve circuit described, for example, in reference U.S. Pat. Nos. 5,157,608 and 5,081,886, which are assigned to the assignee of my present invention. The valve system described in those reference patents includes clutch and brake servos that are pressurized selectively. The valve system includes solenoid bypass valves that are selectively operable to trigger the operation of pressure distributor valves or shift valves, the latter in turn controlling pressure distribution from a line pressure pump to the servos for the clutches and brakes.

Figure 2:
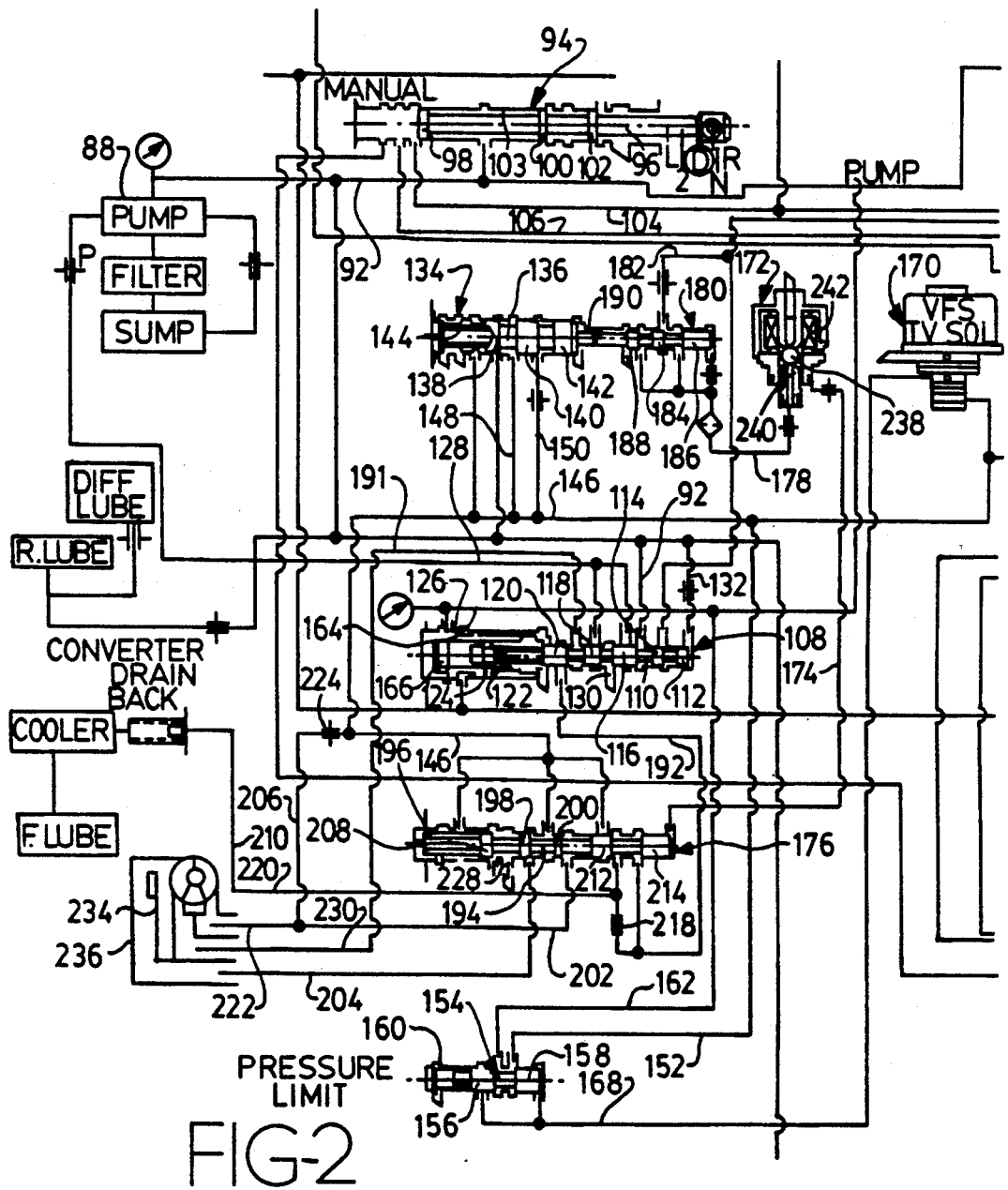
FIG. 2 is a partial view of a control valve system for the transmission of FIG. 1, including the main regulator valve, the bypass clutch control valve and the converter pressure regulator valve which controls pressure distribution to the lubrication circuit and to the converter and bypass clutch as priority in fluid distribution is given to the converter and the bypass clutch.

A portion of a control valve system of the kind disclosed in the '608 and '886 patents that comprises the improvements of my invention is shown in FIG. 2. The control valve system includes a positive displacement pump 88 which, as indicated in FIG. 1, is driven by the engine crankshaft. The pump driveshaft, which is connected to the crankshaft, is schematically shown in FIG. 1 at 90.

Pump pressure developed by the pump 88 is delivered through passage 92 to a manual valve 94 which comprises a movable valve spool 96 with spaced valve lands 98, 100 and 102. The valve spool is situated in manual valve chamber 103 and can be adjusted by the vehicle operator to any one of the drive range positions indicated by the symbols L,2, D, N and R. These positions respectively correspond to manual low range operation, manual second ratio operation, overdrive range, neutral and reverse. Manual low range operation is indicated in the chart of FIG. 1A by the symbol 1M. The manual second range position of the manual valve corresponds to the 2M position designated in FIG. 1A.

In the schematic valve diagram of FIG. 2, the manual valve 96 is shown in the neutral position. When the manual valve is shifted to the overdrive position, the "2" position or the "L" position, passage 104 is pressurized. Passage 106 is pressurized when the manual valve is adjusted to the "2" position or the "L" position.

The pressure in passage 92 is distributed to main regulator valve 108. Valve 108 includes a valve element 110 having spaced lands 112, 114, 116, 118 and 120. Valve element 110 is slidably positioned in a valve bore and is urged in the right-hand direction, as viewed in FIG. 2, by valve springs 122 and 124 which are seated on fixed valve sleeve 126.

Pressure in passage 182 acts on the differential area of lands 112 and 114. This creates a pressure force during operation in 2nd, 3rd and 4th ratios that urges the valve spool 110 against the force of the springs. This cuts back line pressure in those ratios.

Pump 88 in the embodiment of FIG. 2 is a variable displacement pump. Pump displacement control pressure in passage 128 is distributed to the pump 88 and makes a control adjustment to decrease the pump displacement upon a rise in the pressure in passage 128. The pressure in passage 128 is regulated by land 118 which controls the degree of communication between passage 128 and exhaust port 130. Land 116 controls the degree of communication between passage 128 and the line pressure passage 92. Pump pressure is distributed from passage 92 to the right-hand side of the land 112 through feedback passage 132. Pump pressure then will increase the pressure force in a left-hand direction on the valve spool 110. This tends to decrease the degree of communication between the exhaust port and passage 128 while increasing the degree of communication between passage 92 and passage 128 across the land 116.

Converter regulator valve 134 comprises a valve spool 136 having three spaced lands 138, 140 and 142. Line pressure from passage 92 is distributed to the valve chamber for converter regulator valve 134 at a location intermediate lands 138 and 140. These lands control communication between passage 92 and a solenoid feed passage 146. Solenoid feed pressure passage 146 communicates through passage 148 with the space between lands 138 and 140. It communicates also through feedback passage 150 with the space in the valve chamber between lands 140 and 142. These lands have a differential area, thus allowing a pressure feedback force to be developed that opposes the force of the spring 144.

Solenoid feed pressure passage 146 communicates with passage 152, which extends to the pressure limit valve 154. That valve comprises a valve spool having spaced lands 156 and 158. Valve spool is biased in a right-hand direction by valve spring 160. When the valve spool is moved to the left from the position shown in FIG. 2, communication is established between passage 168 and passage 162. Passage 152 is blocked. Passage 162 delivers solenoid feed pressure to passage 164, which communicates with the left-hand side of valve land 166 of a booster valve element that forms a part of the main regulator valve assembly. Spring 122 seats on the booster valve element. The effective spring force acting on the main regulator valve spool 110 thus increases, thereby increasing the regulated pressure level in line pressure passage 92.

The pressure limit valve 154 controls communication between the variable force solenoid pressure passage 168 and throttle valve pressure passage 162. When the variable force solenoid pressure developed by the variable force solenoid valve shown at 170 increases, a pressure force will be established on the pressure limit valve, urging it in a left-hand direction, thus establishing a pressure in passage 162 that is determined by the output of the variable force solenoid valve 170. The magnitude of the line pressure maintained by the main regulator valve assembly then depends upon the output pressure of the variable force solenoid valve 170 when the valve 154 is in its left hand position. If the signal from the variable force solenoid valve 170 should fail or be interrupted for some reason, the pressure limit valve 160 will shift in a right-hand direction, thereby establishing direct communication between passage 152 and passage 162. Thus, line pressure will be maintained in passage 92, regardless of a loss of a pressure signal in passage 168.

The bypass clutch solenoid valve shown at 172 establishes a controlled bypass clutch control pressure in passage 174 which is distributed to the bypass clutch control valve 176. Pressure is supplied to the bypass clutch solenoid valve 172 through passage 178 which is the output pressure for the solenoid regulator valve 180. The supply pressure for the solenoid regulator valve 180 is the pressure in passage 182 which is pressurized by the manual valve whenever the transmission is conditioned for a second, third or fourth ratio. It is not pressurized when the transmission is conditioned for first ratio operation.

The pressure in passage 182 is distributed to the space between lands 184 and 186 of the solenoid regulator valve 180. The degree of communication between passage 182 and an exhaust passage 188 decreases as the pressure forces acting on the solenoid regulator valve 180 increase in opposition to the force of valve spring 190. This is accompanied by an increase in the degree of communication between passage 182 and passage 178. A feedback pressure area on the right-hand side of the land 186 communicates with the passage 178.

Land 120 on the main regulator valve controls communication between converter fluid return passage 191 and passage 192 extending to the bypass clutch control Valve 176. When the valve element 110 is shifted into the position shown in FIG. 2, communication between passage 191 and passage 192 is interrupted.

The bypass clutch control comprises valve spool 194 which is urged in a right-hand direction by valve spring 196.

Solenoid feed pressure passage 146 communicates with the bypass clutch control valve at a location between lands 198 and 200. Lands 198 and 200 are formed with a differential area so that the pressure in passage 146 creates a pressure force on the valve element 194 that opposes the force of the spring 196. Land 200 on the bypass clutch control controls communication between passage 146 and converter inlet pressure passage 202. A converter bypass clutch feed passage 204 communicates with the space between land 198 and land 200 when the valve element 194 is positioned as shown in FIG. 2. That position corresponds to an unlocked condition for the converter bypass clutch. Converter supply pressure fluid in passage 146 is cut off from passage 202 by the land 200 when the valve spool 194 assumes the position shown in FIG. 2. Converter inlet pressure continues to be distributed to the converter, however, through passage 206 which communicates with the solenoid feed pressure passage 146 through orifice 224.

The solenoid feed pressure passage 146 communicates with a pressure booster valve land 208 at the left-hand side of the spool 194 for the bypass clutch control. The spring 196 acts directly on the land 208. Pressure in passage 146 thus supplements the biasing force of the spring 196.

When the main regulator valve element 110 is in its regulating position, cooler and lubrication fluid is distributed to passages 192. Passage 192 communicates with the cooler and the lubrication circuit through passages 210 and 220 and the space between lands 212 and 214. If the valve element 194 is shifted in the left-hand direction, which is the position corresponding to a converter lockup condition flow through the space between lands 212 and 214 is interrupted, but the flow will continue through the flow control orifice 218. Flow to the cooler and the lubrication circuit will continue, but it will be delivered at a lower rate.

When the bypass clutch control valve is shifted in a left-hand direction, which corresponds to the locked bypass clutch condition, communication is established directly between passage 146 and the cooler and lubrication circuit through passage 220. The need for converter flow is less since the lack of torque multiplication in the converter will result in less generated heat in the oil.

If the demand for pressurized fluid increases during a transient condition, it is possible for the line pressure to fall momentarily. This will result in shifting movement of the valve element 110 in a right-hand direction. This will tend to cut off communication between passage 191 and passage 192. At that time, converter fluid return flow in passage 230 is blocked by land 120 in valve element 110 of main regulator valve 108. All of the fluid, then, that is delivered through passage 146 will be transferred directly to the converter inlet passage 222. As the main regulator valve is bypassed, orifice 224 in the passage 146 controls the delivery of pressurized fluid to the converter. Thus, even though there exists a transient condition that will cause a fall-off in line pressure, the converter pressure will continue to be maintained in the converter circuit. The fluid pressure delivered to the converter passages thus is never cut off from the feed passage 146, although the lubrication flow to the lubrication circuit may be cut off. Thus, the converter is given higher priority than the lubrication circuit as the fluid delivery to the lubrication circuit is blocked at the main regulator valve.

Figure 3:
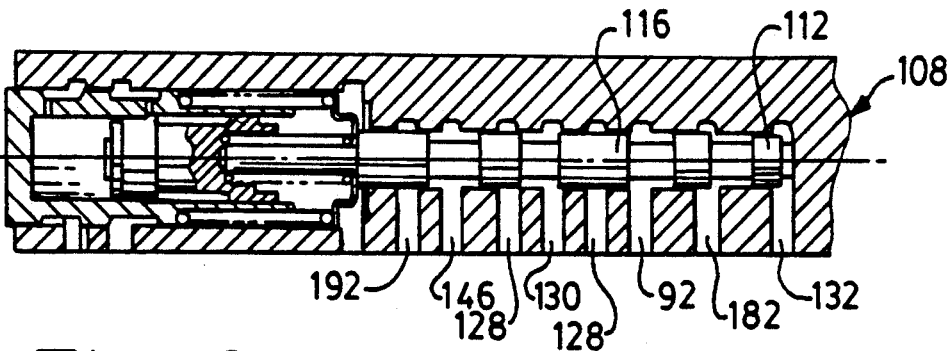
FIG. 3 is an enlarged view of the main regulator, shown in FIG. 2, with the valve spool for the main regulator in its fully relaxed, nonregulating position.
Figure 3A:
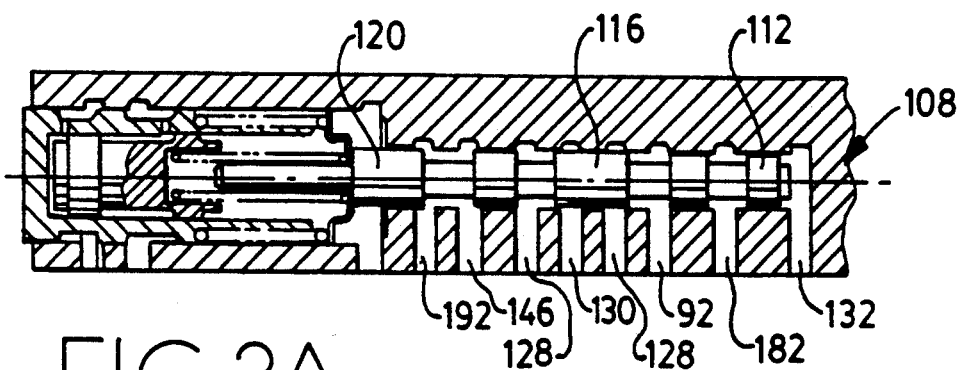
FIG. 3A is a view of the main regulator similar to the view of FIG. 3 wherein the movable valve element of the main regulator is in its regulating position.

FIG. 3 shows the regulator valve element 110 in the position that it might assume when the line pressure falls off temporarily due to a transient condition that requires increased pump flow. In this position of the valve land 116, which is a pressure regulating land, will result in decreased communication between line pressure passage 92 and the pump control pressure passage 128, thus resulting in an increased pump pressure which will tend to restore the pressure acting on the right-hand side of land 112. The valve element 110 then will assume its normal regulating position as shown in FIG. 3A. When it is in that position, land 120 uncovers the port for lube supply passage 192.

Figure 3B:
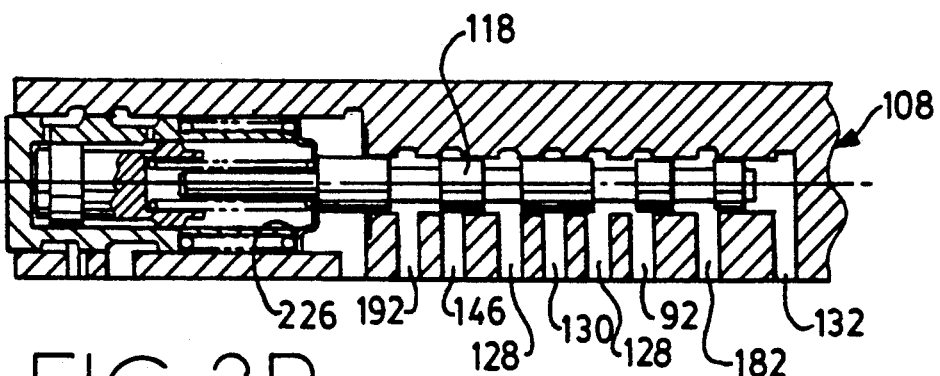
FIG. 3B is a view similar to the view of FIG. 3 showing the main regulator valve element stroked to a position that would correspond to a transient driving condition requiring a decreased pump flow.

FIG. 3B represents an extreme condition for which the valve element 110 will be bottomed against the stop shown at 226 at the left side of the main regulator valve assembly.

The converter fluid is supplied to the torque converter circuit continuously through passage 222. Thus, the converter pressure is maintained at any desired level at all times. The bypass clutch pressure in passage 204, however, can be varied by the bypass clutch control valve so that the pressure differential across the bypass clutch will change depending upon the signal that is distributed to the bypass clutch control through passage 174 from the bypass clutch solenoid 172.

Figure 4:
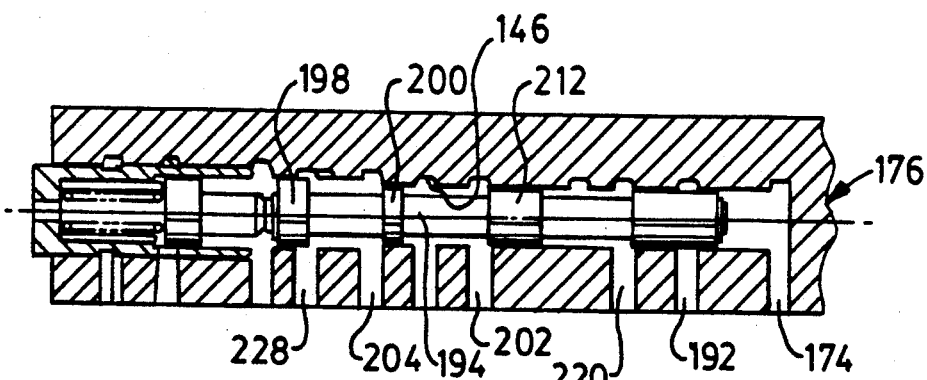
FIG. 4 is a detailed view of the bypass clutch control valve shown in FIG. 2 with the valve element in its position corresponding to a locked bypass clutch.

FIG. 4 shows the bypass clutch control valve in its position corresponding to a locked bypass clutch. An exhaust port 228 then communicates with the bypass clutch passage 204 as the land 198 establishes communication between exhaust port and passage 204.

Figure 4A:
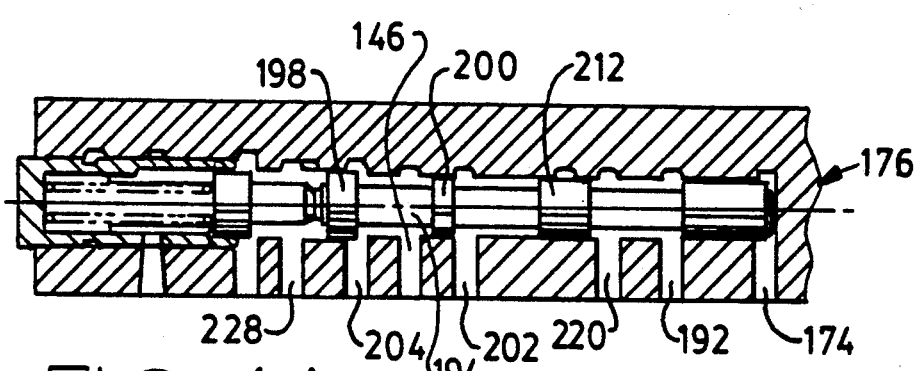
FIG. 4A is a view of the valve of FIG. 4 showing the valve position corresponding to an unlocked bypass clutch.

FIG. 4A shows the position of the valve spool 194 when the bypass clutch is unlocked and the converter is operating as an open converter. This is the condition illustrated in FIG. 2 where the servo feed passage 146 communicates directly with the passage 204 between lands 198 and 200.

Figure 4B:
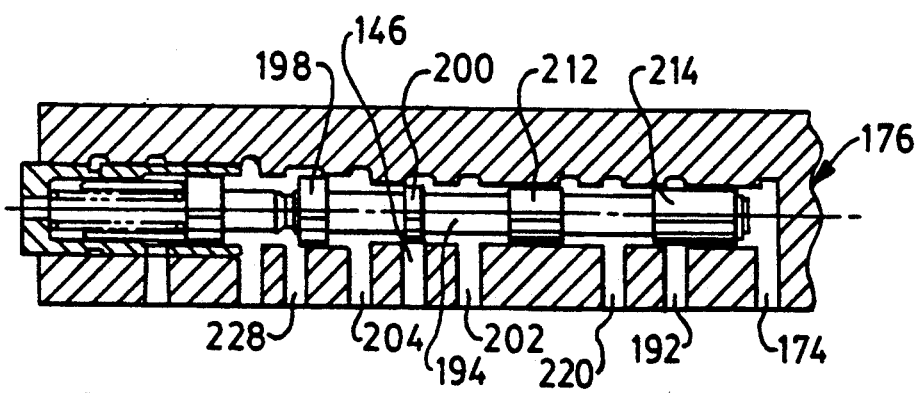
FIG. 4B is a view corresponding to FIG. 4 wherein the valve is positioned in its regulating position so that a modulated bypass clutch control pressure is distributed to the bypass clutch.

FIG. 4B shows the valve element 194 in its regulating position. The degree of communication between passage 204 and passage 146 is controlled by land 200, and the degree of communication between passage 204 and exhaust port 228 is controlled by land 198. The magnitude of the pressure in passage 204 thus depends upon the magnitude of the signal pressure in passage 174 acting on the right-hand end of the land 214.

As seen in FIG. 2, all of the fluid circulating through the converter is returned to the main regulator valve through passage 230 and through communicating passage 191.

For an understanding of the manner in which the bypass clutch operates, reference may be made to U.S. Pat. No. 5,029,087. The bypass clutch includes a movable clutch disc 234 which defines with the converter housing 236 a clutch control pressure chamber which is supplied by fluid through passage 204. The pressure in the clutch control chamber and the fluid pressure in the converter circuit establish a pressure differential across the movable clutch disc 234 when the pressure in the converter is higher than the pressure in the control chamber. Full engagement or partial engagement is achieved by appropriately controlling the magnitude of the pressure in passage 204. As explained in U.S. Pat. No. 5,029,087, this bypass clutch pressure control is achieved by the bypass clutch control valve acting in cooperation with the bypass clutch solenoid 172.

The bypass clutch solenoid valve 172, the solenoid valve 170 and the shift solenoid valves (not shown) are actuated by signals received from one electronic microprocessor of the kind disclosed in the '608, '886 and '087 patents discussed above. The microprocessor responds to input signals from engine and driveline sensors including engine throttle position, vehicle speed, engine speed and transmission drive ratio.

The construction and operation of a solenoid valve that may be used in the circuit of FIG. 2 is described in U.S. Pat. No. 5,157,608. It includes a ball valve element 238 that is seated on a flow control orifice 240, which is in communication with the regulated bypass clutch solenoid feed passage 178. The armature of a solenoid actuator, having solenoid windings 242, establishes a force on the ball valve element 238 that depends upon the magnitude of the current supplied to the windings, thus establishing a pressure in passage 174 that depends upon the magnitude of the signal distributed from the electronic controller to the solenoid windings.

Having described a preferred embodiment of my invention, what I claim and desire to secure by United States Letters Patent is:

1. A control valve system for an automatic transmission comprising multiple ratio gearing and a hydrokinetic torque converter, said converter having an impeller and a turbine, a torque input shaft connected to said impeller, a torque output shaft connected to torque output elements of said gearing;

a fluid pressure pump, a control valve circuit means for controlling ratio changes in said gearing, a main pressure regulator valve means communicating with said pump for maintaining a desired fluid pressure in said circuit means;

a lubrication fluid pressure circuit means for delivering lubrication fluid to said gearing;

a fluid pressure operated bypass clutch means in said torque converter for establishing a mechanical torque flow path around said turbine and said impeller;

a converter fluid pressure feed passage means communicating with said main pressure regulator valve means and with said torque converter, said regulator valve means including pressure regulator valve portions adapted to maintain a desired pressure level in said torque converter;

a bypass clutch control valve means communicating with said converter fluid pressure feed passage means for controlling distribution of clutch controlling pressure to said bypass clutch means;

said main pressure regulator valve means including portions for distributing lubricating fluid pressure to said lubrication fluid pressure circuit means and for interrupting such distribution upon a transient reduction in pressure in said control valve circuit means whereby priority in pressurized fluid distribution is given to said torque converter.

2. A control valve system for an automatic transmission having multiple ratio gearing and a hydrokinetic torque converter with a bypass clutch means for establishing a friction torque flow path in parallel with said torque converter;

said valve system including a pump, fluid pressure operated means for establishing and disestablishing ratio changes in said gearing, a main pressure regulator valve means communicating with said pump for establishing a regulated pressure in said valve system, a converter regulator valve means communicating with said main regulator valve means for establishing a regulated converter pressure;

a bypass clutch control valve means communicating with said converter regulator valve means for controlling pressure distribution to said bypass clutch means; and a lubricating fluid flow circuit for said gearing communicating with said main regulator valve means, said main regulator valve means including portions adapted to interrupt distribution of fluid to said lubrication fluid flow circuit in response to a transient decrease in control valve system pressure whereby priority in available pump capacity is given to said converter over the fluid flow requirements of said lubrication fluid flow circuit.

3. The combination as set forth in claim 1 wherein said valve system includes a bypass clutch solenoid operated control valve, a converter pressure regulator valve means communicating with said main pressure regulator valve means, said solenoid operated bypass clutch control valve means communicating with said bypass clutch control valve means for establishing in said bypass clutch a variable pressure, the pressure maintained in said converter thereby being independent of changes in pressure maintained by said main pressure regulator valve means due to a transient demand by said valve system for increased pump output.

4. The combination as set forth in claim 2 wherein said valve system includes a bypass clutch solenoid operated control valve communicating with said bypass clutch control valve means for establishing in said bypass clutch means a variable pressure, the pressure maintained in said converter thereby being independent of changes in pressure maintained by said main pressure regulator valve means due to a transient demand by said valve system for increased pump output.

5. The combination as set forth in claim 3 wherein said bypass clutch control valve means is disposed in and partly defines a parallel fluid flow path for said lubrication fluid pressure circuit means, said bypass clutch control valve means being adapted to block said parallel fluid flow path when it assumes a bypass clutch engaged position and to open said parallel fluid flow path when it assumes a bypass clutch disengaged position.

6. The combination as set forth in claim 1 wherein said valve system comprises a converter fluid return flow passage communicating with said main pressure regulator valve means and with said torque converter, said regulator valve means including valve portions adapted to interrupt converter return flow in said return flow passage during said transient reduction in pressure in said control valve circuit means.

7. The combination as set forth in claim 2 wherein said valve system comprises a converter fluid return flow passage communicating with said main pressure regulator valve means and with said torque converter, said regulator valve means including valve portions adapted to interrupt converter return flow in said return flow passage during said transient decrease in control valve system pressure.

* * * * *